United States Patent
Yang

(10) Patent No.: US 8,218,308 B2
(45) Date of Patent: Jul. 10, 2012

(54) FASTENING MECHANISM FOR FASTENING AN INTERFACE CARD AND RELATED COMPUTER DEVICE

(75) Inventor: Fu-Jen Yang, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 244 days.

(21) Appl. No.: 12/835,759

(22) Filed: Jul. 14, 2010

(65) Prior Publication Data

US 2011/0157820 A1    Jun. 30, 2011

(30) Foreign Application Priority Data

Dec. 25, 2009   (TW) ................. 98224370 U

(51) Int. Cl.
*H05K 5/00* (2006.01)
*H05K 7/00* (2006.01)

(52) U.S. Cl. ......... 361/679.32; 361/679.33; 361/679.37; 361/679.38; 361/679.39

(58) Field of Classification Search ............. 361/679.32, 361/679.33, 679.37, 679.38, 679.39
See application file for complete search history.

(56) References Cited

U.S. PATENT DOCUMENTS

| 6,487,070 | B2 * | 11/2002 | Gan ......................... 361/679.58 |
| 6,549,398 | B2 * | 4/2003 | Chen ........................ 361/679.58 |
| 6,704,205 | B1 * | 3/2004 | Chen ............................ 361/740 |
| 7,443,666 | B2 * | 10/2008 | Huang ..................... 361/679.32 |
| 2005/0059285 | A1 * | 3/2005 | Chen et al. .................... 439/325 |
| 2006/0018101 | A1 * | 1/2006 | Huang .......................... 361/726 |

\* cited by examiner

*Primary Examiner* — Anthony Haughton

(74) *Attorney, Agent, or Firm* — Winston Hsu; Scott Margo

(57) ABSTRACT

A fastening mechanism includes a main body passing through an opening on a casing rotatably, and a fastening part connected to the main body. A slot is formed on the fastening part for fastening a board of an interface card when the main body rotates to a fastening position relative to the casing. The fastening mechanism further includes a fixing part connected to the main body for engaging with the casing when the main body rotates to the fastening position relative to the casing so as to fix the fastening part and the interface card, and an elastic cantilever connected to the fixing part for providing elastic force to the fixing part so as to engage the fixing part with the casing and for driving the fixing part so as to release engagement between the fixing part and the casing when being pressed downward.

20 Claims, 8 Drawing Sheets

FASTENING MECHANISM FOR FASTENING AN INTERFACE CARD AND RELATED COMPUTER DEVICE

BACKGROUND OF THE INVENTION

1. Field of the Invention

The present invention relates to a fastening mechanism for fastening an interface card and a related computer device, and more specifically, to a fastening mechanism for fastening an interface card in a rotatable manner and a related computer device.

2. Description of the Prior Art

In modern information society, computer devices are becoming necessary. Thus, the mechanical design of fastening an interface card is an important issue in the computer industry. The conventional fastening mechanism for fastening the interface card utilizes a plurality of screws to screw the interface card on a holder, so as to fasten the interface card inside a computer casing. Generally speaking, the interface card is a replaceable component in a computer. Therefore, it is very important for users to assemble and disassemble the interface card conveniently. However, it is very inconvenient to utilize screws of the conventional fastening mechanism for fastening the interface card, due to disadvantages of assembly with a specific tool, being easy to lose, being time-consuming, being laborious, and so on.

SUMMARY OF THE INVENTION

The present invention provides a fastening mechanism for fastening an interface card in a rotatable manner and a related computer device to solve the problems mentioned above.

According to the claimed invention, a fastening mechanism for fastening an interface card, the fastening mechanism includes a main body, a fastening part, a fixing part, and an elastic cantilever. The main body passes through an opening on a casing rotatably. The fastening part is connected to the main body, and a slot is formed on the fastening part for fastening a board of the interface card when the main body rotates to a fastening position relative to the casing. The fixing part is connected to the main body for engaging with the casing when the main body rotates to the fastening position relative to the casing so as to fix the fastening part and the interface card. The elastic cantilever is connected to the fixing part for providing elastic force to the fixing part so as to engage the fixing part with the casing and for driving the fixing part so as to release engagement between the fixing part and the casing when being pressed downward.

According to the claimed invention, a computer device includes a casing, a circuit board, an interface card and a fastening mechanism for fastening an interface card. An opening is formed on the casing. The circuit board is installed in the casing, and an interface card slot is disposed on the circuit board. The interface card is installed inside the casing and inserted in the interface card slot.

The fastening mechanism for fastening the interface card, the fastening mechanism includes a main body, a fastening part, a fixing part and an elastic cantilever. The main body passes through an opening on a casing rotatably. The fastening part is connected to the main body, and a slot is formed on the fastening part for fastening a board of the interface card when the main body rotates to a fastening position relative to the casing. The fixing part is connected to the main body for engaging with the casing when the main body rotates to the fastening position relative to the casing so as to fix the fastening part and the interface card. The elastic cantilever is connected to the fixing part for providing elastic force to the fixing part so as to engage the fixing part with the casing and for driving the fixing part so as to release engagement between the fixing part and the casing when being pressed downward.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
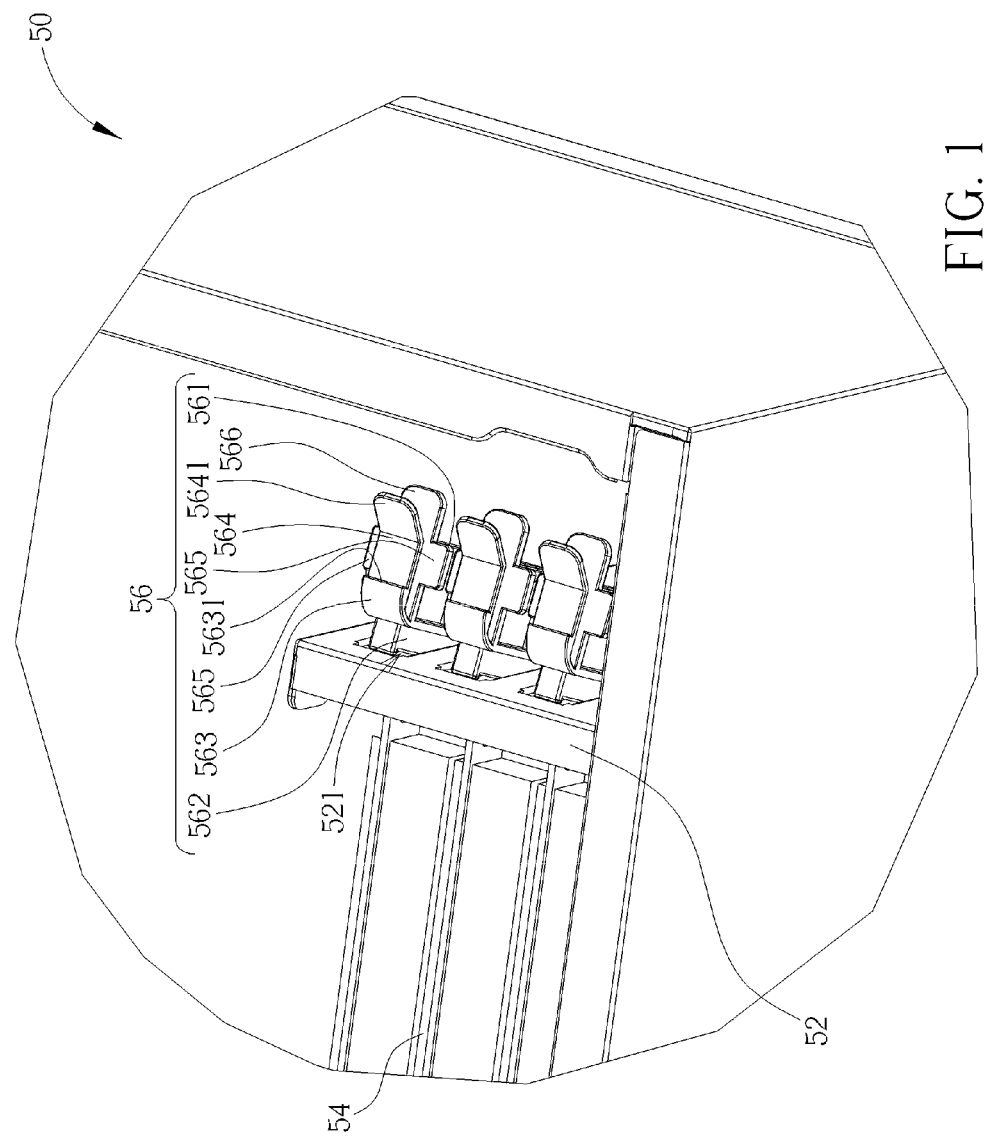
FIG. 1 to FIG. 3 are schematic diagrams of part of a computer device in different states according to a preferred embodiment of the present invention.
Figure 2:
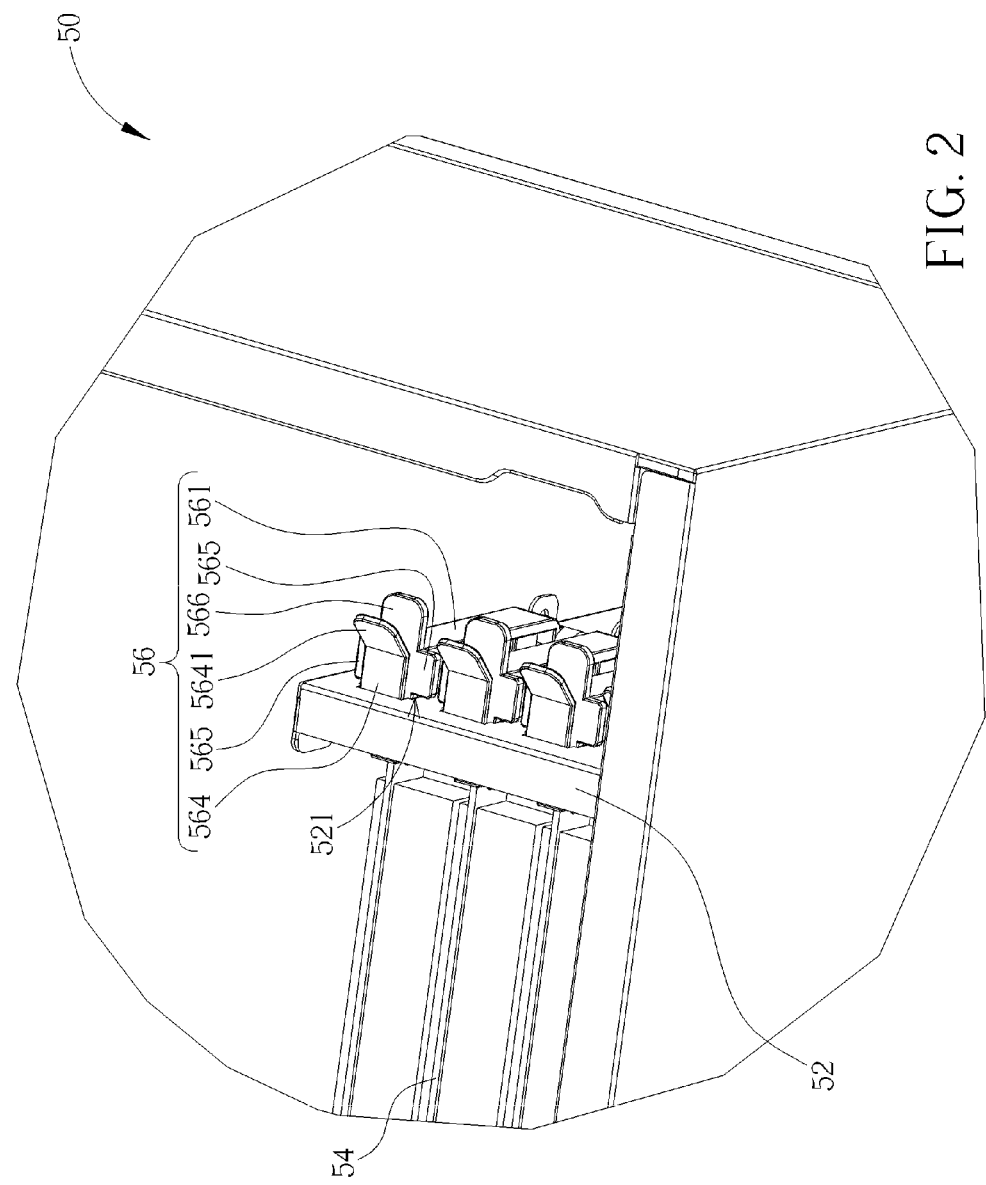
Figure 3:
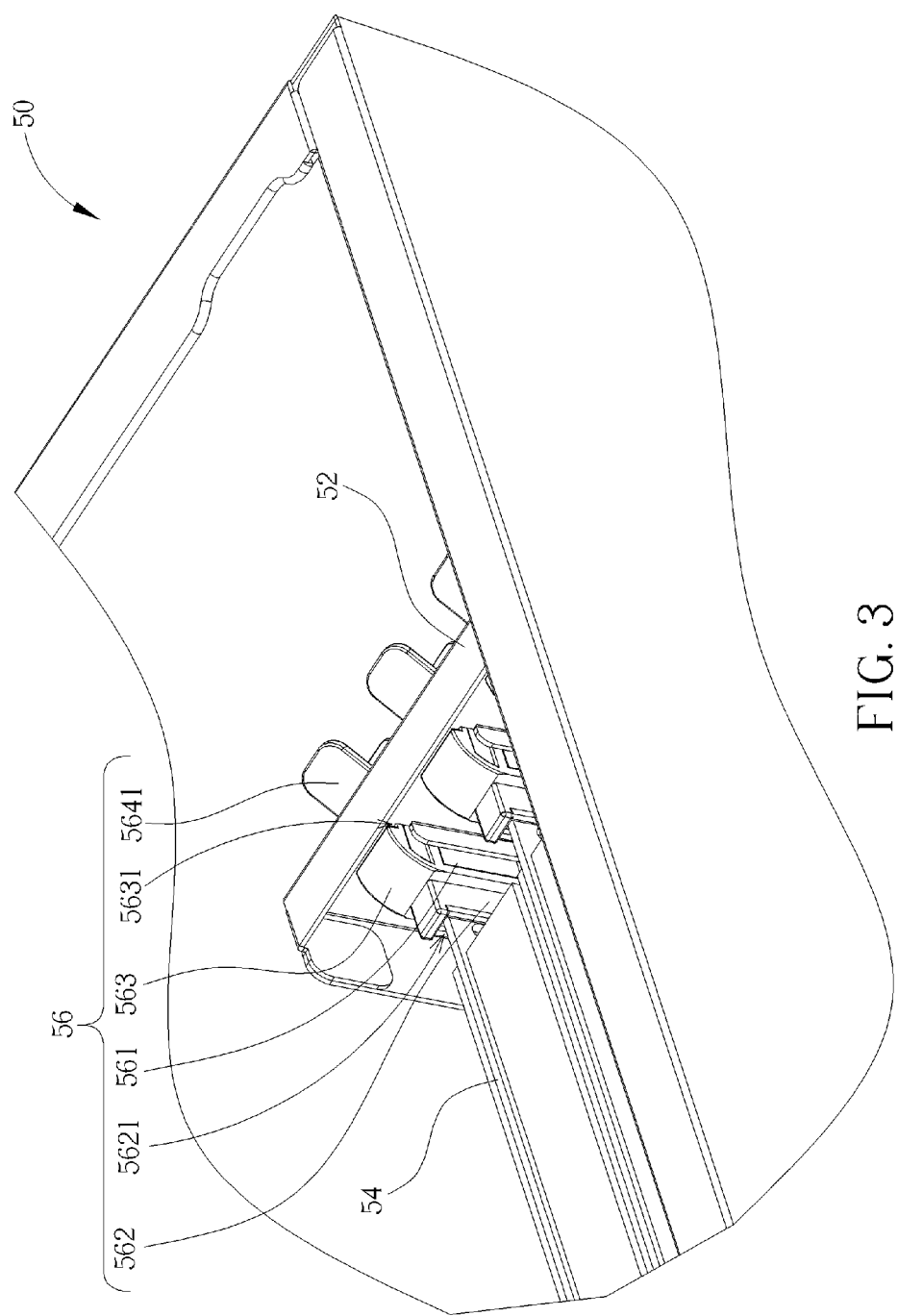

Please refer to FIG. 1 to FIG. 3. FIG. 1 to FIG. 3 are schematic diagrams of part of a computer device 50 in different states according to a preferred embodiment of the present invention. The computer device 50 can be a desktop computer device and so on. The computer device 50 includes a casing 52 for fixing and covering internal components of the computer device 50, and at least one opening 521 is formed on the casing 52. The computer device 50 further includes at least one interface card 54. The interface card 54 can conform to various transmission interfaces of expansion cards, such as Peripheral Component Interface (PCI), Peripheral Component Interface-Express (PCI-E), Accelerated Graphics Port (AGP), or other bus transmission interfaces. The interface card 54 can be a sound card, a SCSI card, a network card, a display card, a memory card, and so on.

The computer device 50 further includes at least one fastening mechanism 56 for fastening an interface card 54 inside the casing 52. The fastening mechanism 56 includes a main body 561 passing through an opening 521 on the casing 52 rotatably. The fastening mechanism 56 further includes a fastening part 562 connected to the main body 561. A slot 5621 is formed on the fastening part 562 for fastening the interface card 54 when the main body 561 rotates to a fastening position relative to the casing 52, as shown in FIG. 2 and FIG. 3. A length of the slot 5621 of the fastening part 562 can be substantially smaller than, equal to or larger than a height of a side of the interface card 54, wherein the side is for being fastened in the slot 5621 of the fastening part 562. The fastening mechanism 56 further includes a fixing part 563 connected to the main body 561 for engaging with the casing 561 when the main body 561 rotates to the fastening position relative to the casing 52 so as to fix the fastening part 562 and the interface card 54. The fixing part 563 includes a blocking wall 5631 for blocking a side of the casing 52 when the main body 561 rotates to the fastening position relative to the casing 52. The fastening mechanism 56 further includes an elastic cantilever 564 connected to the fixing part 563. The elastic cantilever 564 is for providing elastic force to the fixing part 563 so as to engage the fixing part 563 with the casing 52 elastically. The elastic cantilever 564 includes a pressing part 5641. The pressing part 5641 is located at a side of the casing 52 different from a side of the casing 52 whereat the fastening part 562 and the fixing part 563 are located when the main body 561 rotates to the fastening position relative to the casing 52, as shown in FIG. 2 and FIG. 3. Such that a user can press the pressing part 5641 in a wider space to avoid interference with the interface card 54 or the fastening part 562 and the fixing part 563. The elastic cantilever 564 drives the fixing part 563 so as to release engagement between the fixing part 563 and the casing 52 when the user presses the pressing part 5641 of the elastic cantilever 564. Afterwards, the user can rotate the main body 561 from the fastening position shown in FIG. 2 and FIG. 3 to the releasing position shown in FIG. 1, so as to release engagement between the fastening part 562 and the interface card 54.

The fastening mechanism 56 further includes at least one protruding part 565 for blocking a side of the casing 52 different from the side contacting the blocking wall 5631 when the main body 561 rotates to the fastening position relative to the casing 52 as shown in FIG. 2 and FIG. 3, so as to cooperate with the blocking wall 5631 to clamp two sides of the casing 52. Therefore, the fastening mechanism 56 can fix the interface card 54 firmly. In this embodiment, the two protruding parts 565 are connected to two sides of the main body 561 respectively. The number and the position of the protruding parts 565 are not limited to this embodiment, and it can depend on actual design demand. The fastening mechanism 56 further includes a pushing part 566 connected to the main body 561. The user can push the pushing part 566 to drive the main body 561 to rotate relative to the casing 52 from the releasing position as shown in FIG. 1 to the fastening position as shown in FIG. 2 and FIG. 3. Besides, parts of the fastening mechanism 56 can be integrated monolithically. For example, the fastening part 562 and the main body 561 can be integrated monolithically, the elastic cantilever 564 and the fixing part 563 can be integrated monolithically, or the main body 561, the fastening part 562, the fixing part 563, the elastic cantilever 564, the protruding part 565, and the pushing part 566 can be integrated monolithically.

Figure 4:
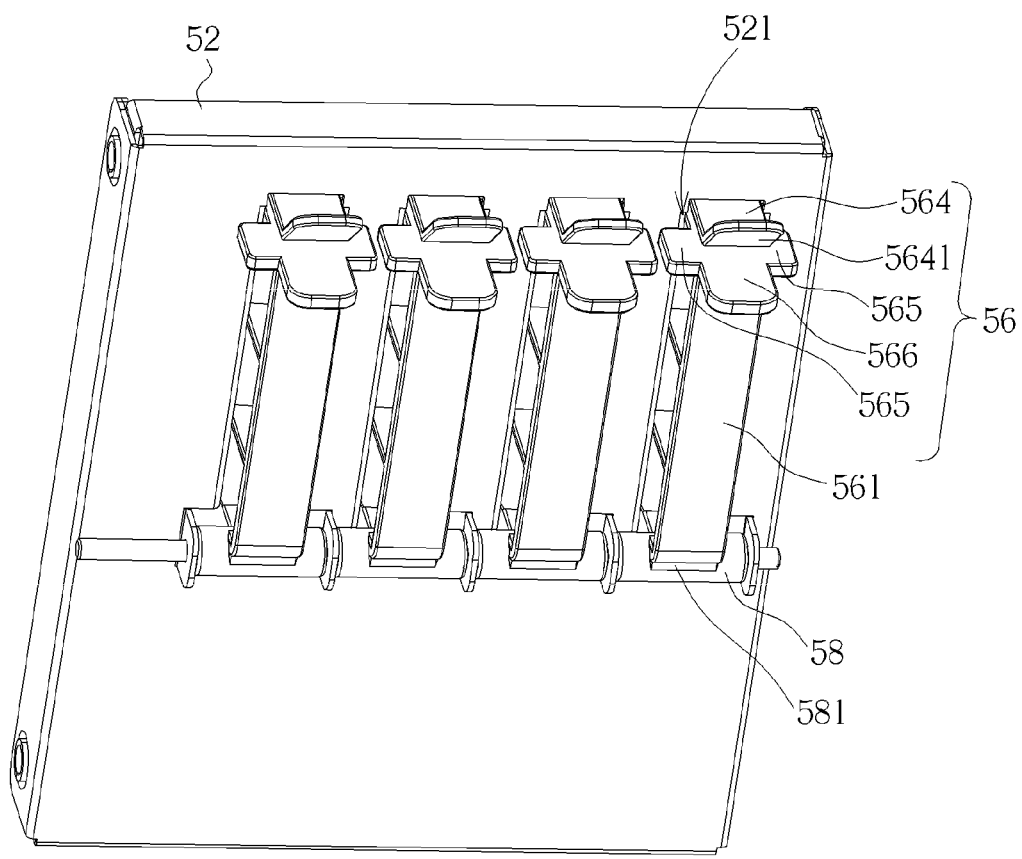
FIG. 4 and FIG. 5 are schematic diagrams of a fastening mechanism in a fastening state at different view angles according to the preferred embodiment of the present invention.
Figure 5:
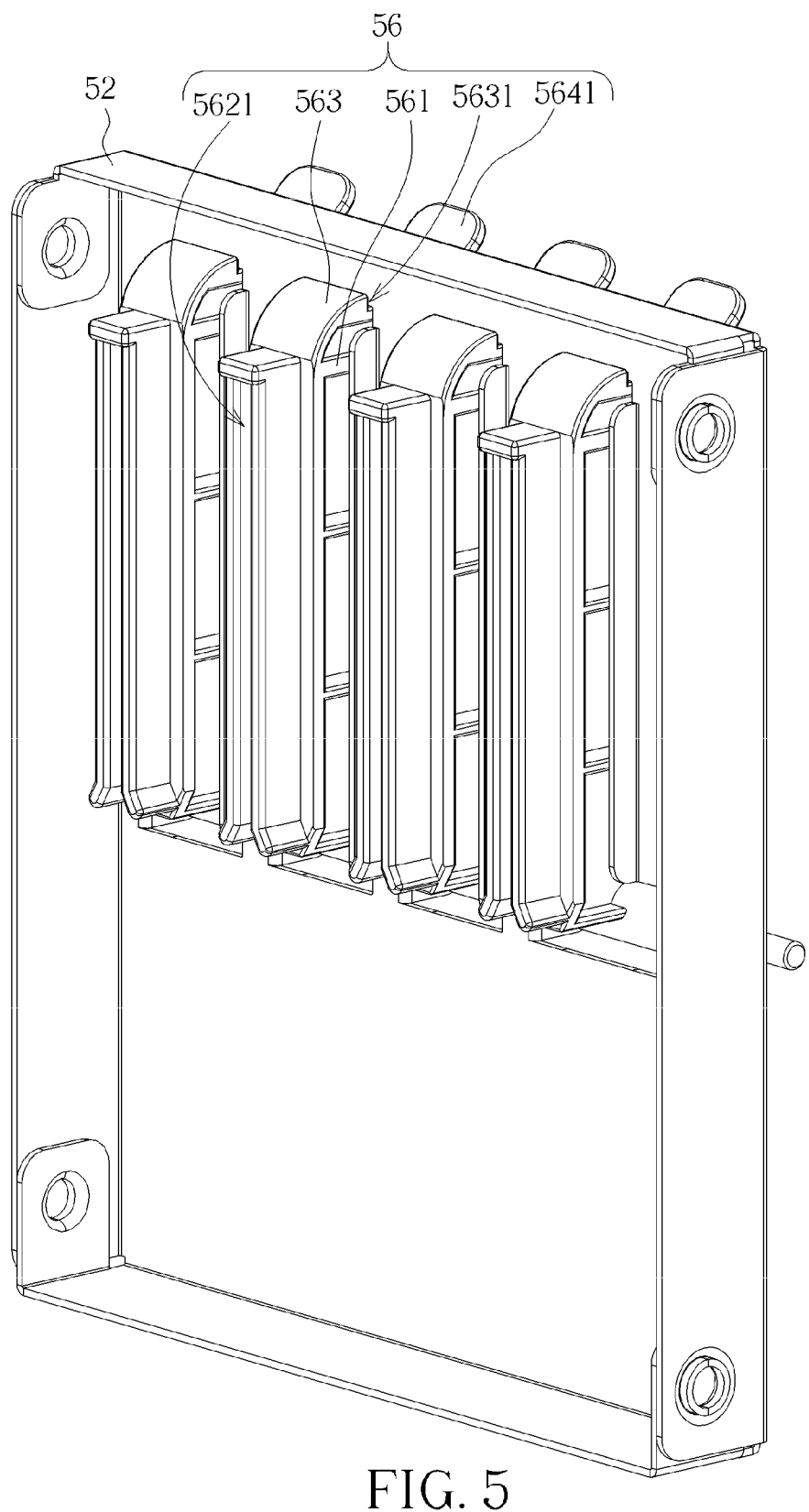
Figure 6:
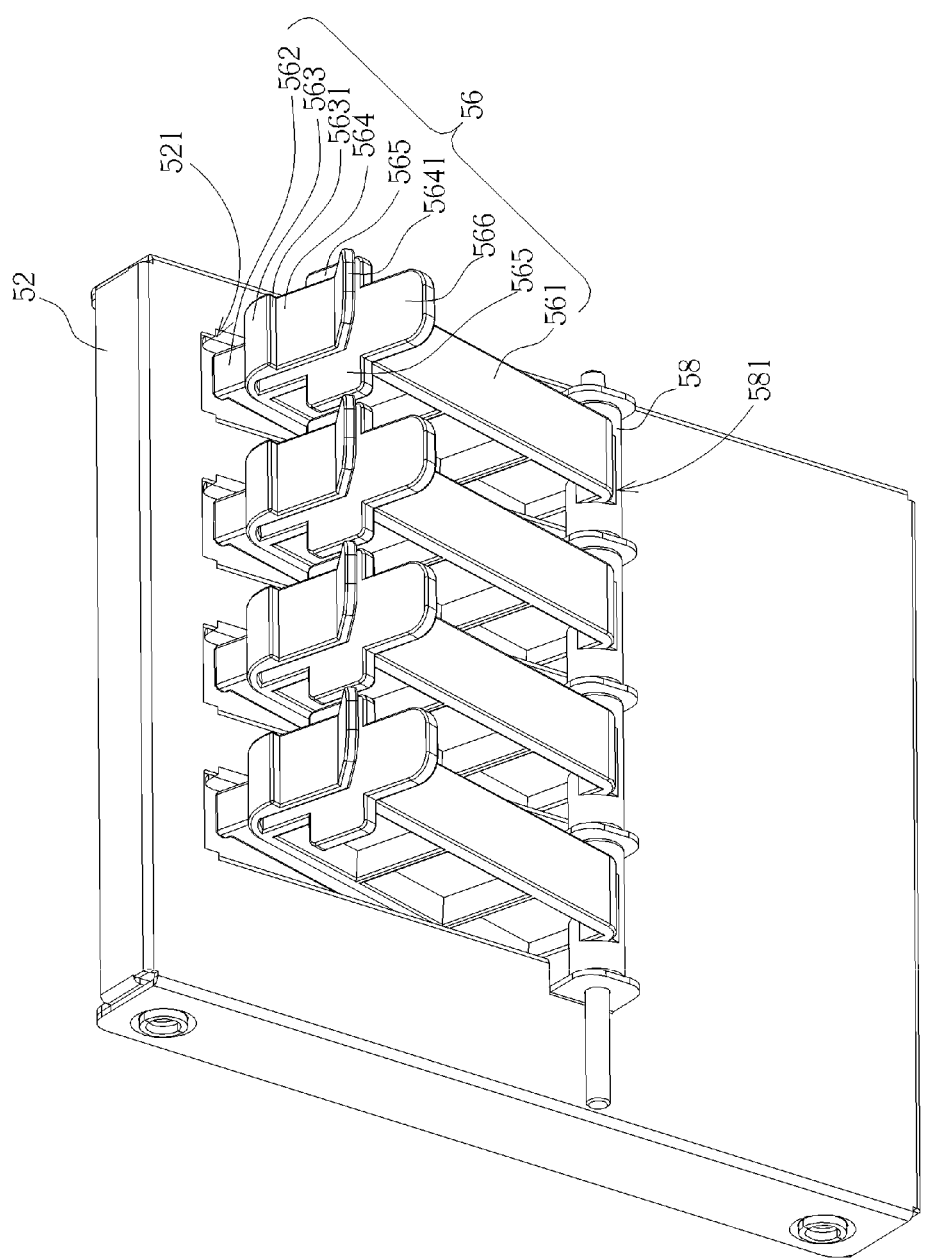
FIG. 6 is a schematic diagram of the fastening mechanism in a releasing state according to the preferred embodiment of the present invention.

Please refer to FIG. 4 to FIG. 6. FIG. 4 and FIG. 5 are schematic diagrams of the fastening mechanism 56 in a fastening state at different view angles according to the preferred embodiment of the present invention. FIG. 6 is a schematic diagram of the fastening mechanism 56 in a releasing state according to the preferred embodiment of the present invention. The fastening mechanism 56 further includes a shaft 58 connected to the main body 561 and pivoted to the casing 52 so that the main body 561 can rotate relative to the casing 52. At least one hole 581 is formed on the shaft 58, and an end of the main body 561 passes through the hole 581. A plurality of the main bodies 561 can be designed to dispose through a plurality of the holes 581 of the shaft 58 in this invention. When the user rotates one of the main bodies 561, the rest of the main bodies 561 can be driven by the shaft 58 to rotate correspondingly with the aforesaid main body 561 in the same direction. Therefore, the user can drive each main body 561 to rotate at the same time, so as to fasten each interface card 54 simultaneously or release each interface card 54 simultaneously. Besides, the main bodies 561 can also be designed to connect to the unlinked shafts 58 correspondingly, so that the user can selectively rotate each main body 561 to fasten each interface card 54 correspondingly or release each interface card 54 correspondingly.

Figure 7:
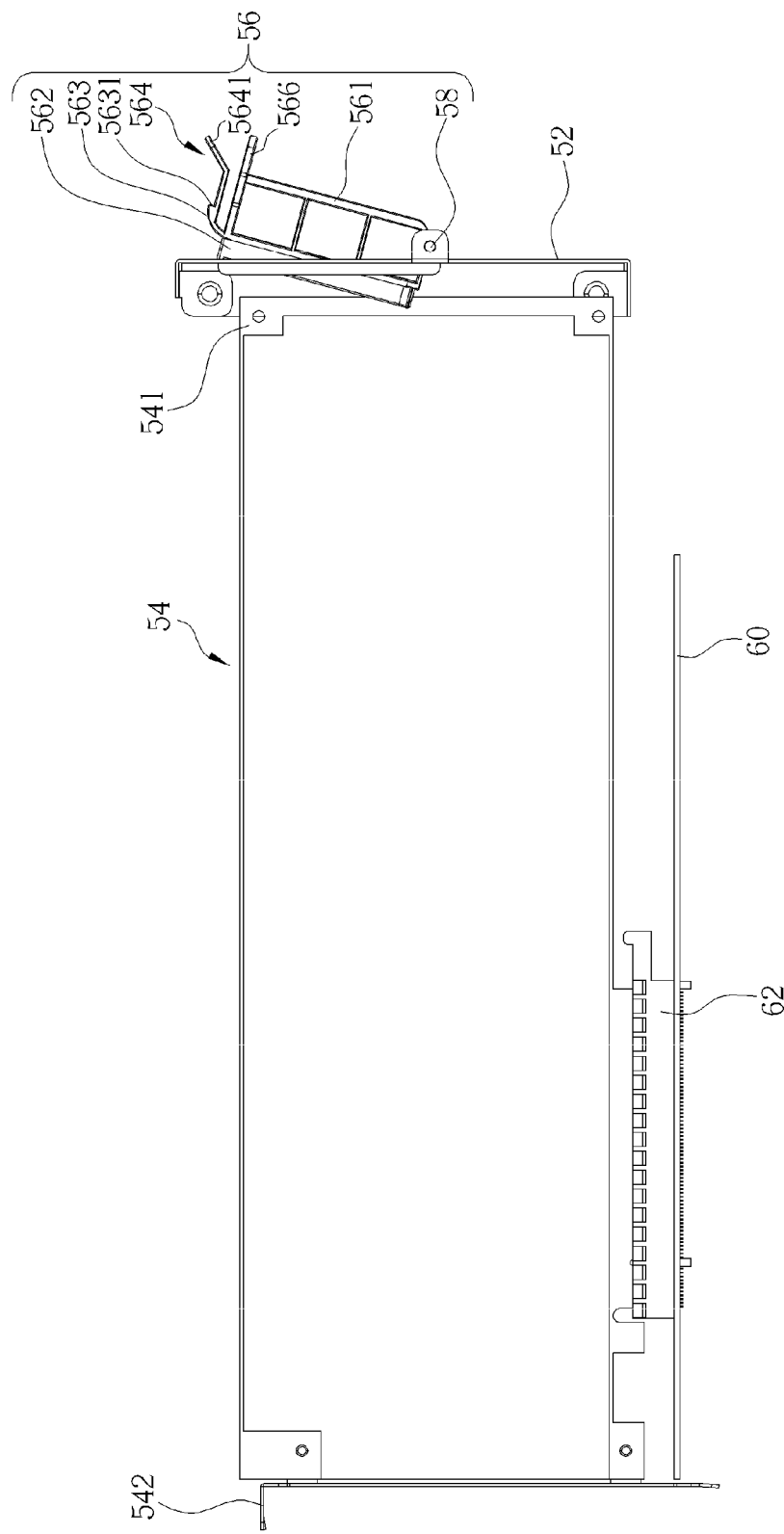
FIG. 7 is a side view of the fastening mechanism in the releasing state without fastening an interface card according to the preferred embodiment of the present invention.
Figure 8:
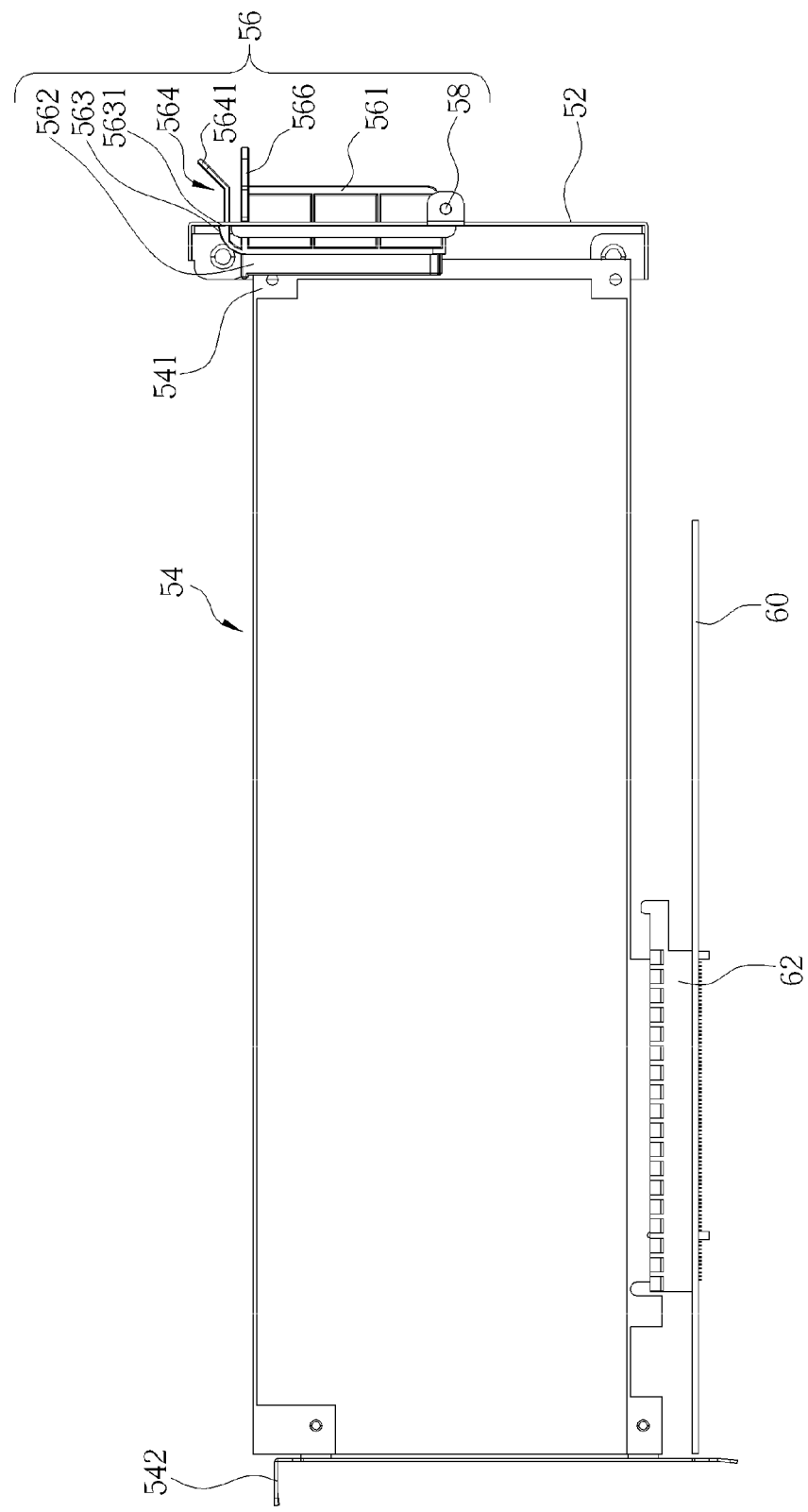
FIG. 8 is a side view of the fastening mechanism in the fastening state of fastening the interface card according to the preferred embodiment of the present invention.

Please refer to FIG. 1 to FIG. 8. FIG. 7 is a side view of the fastening mechanism 56 in the releasing state without fastening the interface card 54 according to the preferred embodiment of the present invention. FIG. 8 is a side view of the fastening mechanism 56 in the fastening state of fastening the interface card 54 according to the preferred embodiment of the present invention. The computer device 50 further includes a circuit board 60 installed in the casing 52. An interface card slot 62 is disposed on the circuit board 60, and the interface card 54 can be inserted in the interface card slot 62 so that signals can be transmitted between the circuit board 60 and the interface card 54. The interface card 54 includes a board 541, and a holder 542 connected to the board 541. Signal connectors can be disposed on the holder 542 for connecting with other peripheral devices. When the fastening mechanism 56 is located at the releasing position as shown in FIG. 1, FIG. 6, and FIG. 7, the fixing part 563 is departed from the casing 52, which means that the blocking wall 5631 does not block the casing 52, and the fastening part 562 does not fasten the board 541 of the interface card 54, so the user can disassemble the interface card 54 at this time. On the other hand, the user can push the pushing part 566 to drive the main body 561 to rotate relative to the casing 52, so as to drive the main body 561 to rotate from the releasing position as shown in FIG. 1, FIG. 6 and FIG. 7 to the fastening position as shown in FIG. 2, FIG. 3, FIG. 4, FIG. 5 and FIG. 8, for fastening the interface card 54. At this time, the fixing part 563 is engaged with the casing 52, which means that the blocking wall 5631 blocks the casing 52, the elastic cantilever 564 provides the elastic force to the fixing part 563, so as to make the fixing part 563 elastically engage with the casing 52, and the protruding part 565 blocks the side of the casing 52 different from the side contacting the blocking wall 5631 at the same time, so as to avoid vibration of the fastening mechanism 56. At this time, the fastening part 562 fastens the board 541 of the interface card 54 so as to ensure a good electrical connection between the interface card 54 and the circuit board 60 and to provide stable quality of signal transmission. The interface card 54 can not be taken apart from the interface card slot 62 at this time. A length of the fastening part 562 can be substantially smaller than, equal to or larger than height of a side of the board 541 of the interface card 54, wherein the side is for being fastened in the slot 5621 of the fastening part 562, which means that the fastening part 562 is capable of covering the side of the board 541 partially or totally.

The user can press the pressing part 5641 of the elastic cantilever 564 for releasing the fastening state of the interface card 54. When the main body 561 is located at the fastening position, the pressing part 5641 is located at the side of the casing 52 different from the side of the casing 52 whereat the fastening part 562 and the fixing part 563 are located. Such that the user can press the pressing part 5641 in a wider space to avoid interferences with the interface card 54 or the fastening part 562 and the fixing part 563. When the user presses the pressing part 5641 of the elastic cantilever 564 downward, the elastic cantilever 564 simultaneously drives the fixing part 563 so as to release engagement between the fixing part 563 and the casing 52. Afterwards, the user can rotate the main body 561 from the fastening position to the releasing position, so as to release engagement between the fastening part 562 and the interface card 54.

Besides, when the interface card 54 is not installed in the interface card slot 62, the user can still rotate the main body 561 to the fastening position and the fixing part 563 and the protruding part 565 clamps two sides of the casing 52 together, so that the fastening mechanism 56 is fixed on the casing 52 firmly.

Compared to the prior art, the present invention provides the fastening mechanism for fastening the interface card in a rotatable manner and the related computer device. It is fast to assemble or disassemble a plurality of the interface card in the casing without any tool, so as to reduce difficulty and time of assembly.

Those skilled in the art will readily observe that numerous modifications and alterations of the device and method may be made while retaining the teachings of the invention.

What is claimed is:

1. A fastening mechanism for fastening an interface card, the fastening mechanism comprising:
    a main body passing through an opening on a casing rotatably;
    a fastening part connected to the main body, a slot being formed on the fastening part for fastening a board of the interface card when the main body rotates to a fastening position relative to the casing;
    a fixing part connected to the main body for engaging with the casing when the main body rotates to the fastening position relative to the casing so as to fix the fastening part and the interface card; and
    an elastic cantilever connected to the fixing part for providing elastic force to the fixing part so as to engage the fixing part with the casing and for driving the fixing part so as to release engagement between the fixing part and the casing when being pressed downward.

2. The fastening mechanism of claim 1 further comprising a shaft connected to the main body and pivoted to the casing so as to make the main body rotate relative to the casing.

3. The fastening mechanism of claim 2, wherein a hole is formed on the shaft, and an end of the main body passes through the hole.

4. The fastening mechanism of claim 1, wherein the fixing part comprises a blocking wall for blocking a side of the casing when the main body rotates to the fastening position relative to the casing.

5. The fastening mechanism of claim 4 further comprising at least one protruding part for blocking a side of the casing different from the side contacting the blocking wall when the main body rotates to the fastening position relative to the casing.

6. The fastening mechanism of claim 1, wherein the elastic cantilever comprises a pressing part located at a side of the casing different from a side of the casing whereat the fastening part and the fixing part are located when the main body rotates to the fastening position relative to the casing.

7. The fastening mechanism of claim 1 further comprising a pushing part, connected to the main body, for driving the main body to rotate relative to the casing when being pushed.

8. The fastening mechanism of claim 1, wherein length of the slot of the fastening part is substantially smaller than, equal to or larger than height of a side of the board of the interface card, wherein the side is for being fastened in the slot of the fastening part.

9. The fastening mechanism of claim 1, wherein the fastening part and the main body are integrated monolithically.

10. The fastening mechanism of claim 1, wherein the elastic cantilever and the fixing part are integrated monolithically.

11. A computer device comprising:
    a casing, an opening being formed on the casing;
    a circuit board installed in the casing, an interface card slot being disposed on the circuit board;
    an interface card installed inside the casing and inserted in the interface card slot; and
    a fastening mechanism for fastening an interface card, the fastening mechanism comprising:
        a main body passing through an opening on a casing rotatably;
        a fastening part connected to the main body, a slot being formed on the fastening part for fastening a board of the interface card when the main body rotates to a fastening position relative to the casing;
        a fixing part connected to the main body for engaging with the casing when the main body rotates to the fastening position relative to the casing so as to fix the fastening part and the interface card; and
        an elastic cantilever connected to the fixing part for providing elastic force to the fixing part so as to engage the fixing part with the casing and for driving the fixing part so as to release engagement between the fixing part and the casing when being pressed downward.

12. The computer device of claim 11, wherein the fastening mechanism further comprising a shaft connected to the main body and pivoted to the casing so as to make the main body rotate relative to the casing.

13. The computer device of claim 12, wherein a hole is formed on the shaft, and
    an end of the main body passes through the hole.

14. The computer device of claim 11, wherein the fixing part comprises a blocking wall for blocking a side of the casing when the main body rotates to the fastening position relative to the casing.

15. The computer device of claim 14, wherein the fastening mechanism further comprising at least one protruding part for blocking a side of the casing different from the side contacting the blocking wall when the main body rotates to the fastening position relative to the casing.

16. The computer device of claim 11, wherein the elastic cantilever comprises a pressing part located at a side different of the casing from a side of the casing whereat the fastening part and the fixing part are located when the main body rotates to the fastening position relative to the casing.

17. The computer device of claim 11, wherein the fastening mechanism further comprising a pushing part, connected to the main body, for driving the main body to rotate relative to the casing when being pushed.

18. The computer device of claim 11, wherein length of the slot of the fastening part is substantially smaller than, equal to or larger than height of a side of the board of the interface card, wherein the side is for being fastened in the slot of the fastening part.

19. The computer device of claim 11, wherein the fastening part and the main body are integrated monolithically.

20. The computer device of claim 11, wherein the elastic cantilever and the fixing part are integrated monolithically.

* * * * *